UNITED STATES PATENT OFFICE.

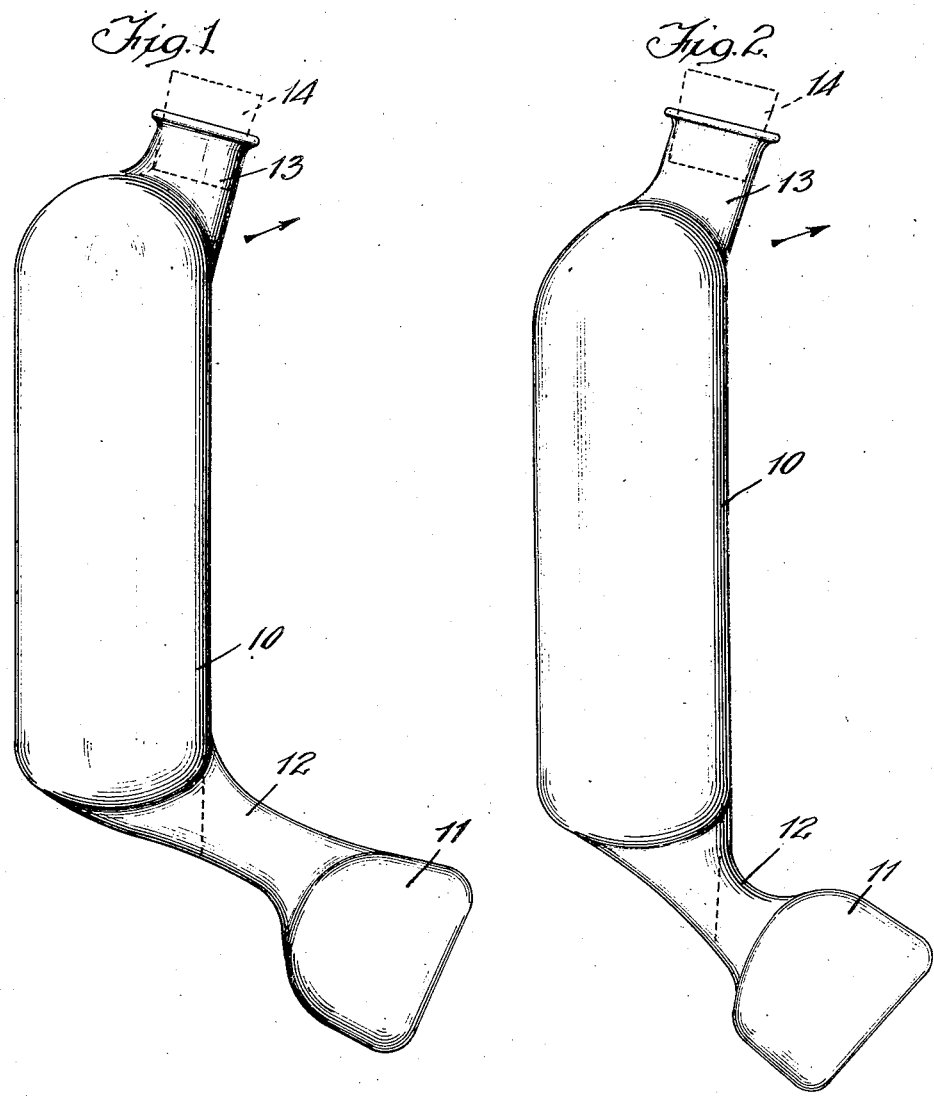

JULIUS JOHN MOJONNIER, OF OAK PARK, ILLINOIS, ASSIGNOR TO MOJONNIER BROS. CO., OF CHICAGO, ILLINOIS, A CORPORATION OF MAINE.

EXTRACTION FLASK OR TUBE.

1,312,340.　　　　　Specification of Letters Patent.　　　Patented Aug. 5, 1919.

Application filed September 22, 1917. Serial No. 192,766.

*To all whom it may concern:*

Be it known that I, JULIUS JOHN MOJONNIER, a citizen of the United States, residing at Oak Park, in the county of Cook and State of Illinois, have invented certain new and useful Improvements in Extraction Flasks or Tubes, of which the following is a specification.

This invention relates to new and useful improvements in extraction flasks or tubes, and is particularly designed as an improvement on the flask or tube forming the subject matter of the co-pending application, Serial No. 20,633, filed April 12, 1915.

The present invention contemplates the reduction of manufacturing cost; the elimination of valves, stop-cocks, and the like; an increase in the efficiency of the tube or flask, such as disclosed in the aforesaid application; and a greater ease in carrying out the process in conjunction with which the present invention is especially designed to be used.

With the above and other objects in view, as will be apparent, this invention consists in the construction, combination, and arrangement of parts, all as hereinafter more fully described, claimed and illustrated in the accompanying drawings, wherein:

Figure 1 is a side elevation of a tube or flask constructed in accordance with the present application.

Fig. 2 is a similar view of a somewhat modified form thereof.

The present flask or tube, as well as that described in the aforesaid application, is particularly adapted for use in conjunction with a process for the extraction of the fat from milk and milk products, in order that the percentage of fat in the entire milk or milk product may be rapidly determined. Principally, this process consists in placing a known quantity of milk or milk product in the flask, and then adding ammonia water, ethyl alcohol, ethyl ether and ligroin in certain known quantities, and thoroughly shaking the tube; thus causing the fat in solution to float upon the residue of the mixture. After the fat has been thoroughly separated, and a clear line of demarcation is apparent between the fat in solution and the residue of the mixture, the fat in solution is withdrawn from the flask or tube in a manner so as to not distribute the residue.

In the aforesaid application, the flask comprises a tube provided with a medial contraction, which forms a settling and an extraction chamber alined one with the other. The contents of the extraction chamber are withdrawn therefrom by means of a discharge tube having a stop-cock communicating with the contraction aforesaid.

The present invention comprises a tube having the extraction chamber 10 and the settling chamber 11, said chambers being connected by a contraction 12, arranged at an angle to one or the other or both of the chambers. In this manner, the extraction chamber 10 rests in a plane at an angle to the settling chamber 11, the contraction forming a means of communication between said chambers. The upper end of the extraction chamber 10, to wit, the end thereof removed from the contraction 12, is provided with an open neck 13 which may be closed by a suitable closure such as the cork 14.

The sample of the milk or milk product is placed in the flask through the neck 13, as are likewise the re-agents, to wit, ammonia water, ethyl alcohol, ethyl ether, and ligroin; after which the neck 13 may be closed by the cork 14, the flask shaken as desired and centrifuged to create a quick settling and the rapid separation of the fat in solution in the chamber 10 and the residue in the chamber 11. Of course, the contents of the chamber 10 and also of the chamber 11 extend into the extraction 12 and the line of demarcation or separation is usually located therein. After the fat in solution in the extraction chamber 10 is clearly distinguishable from the residue in the settling chamber 11, the cork is removed and the flask tilted in the direction of the arrow in both figures of the drawing, which causes the contents of the extraction chamber to flow from the neck 13. The angular arrangement of the contraction 12 in the flask retains the residue within the settling chamber 11, and the line of demarcation or separation between the fat in solution and the residue when the extraction chamber 10 is empty assumes the approximate position of the dotted line in the contraction in both figures of the drawing. In this manner, the extraction chamber 10 may be over one-half inverted and the entire contents thereof, to wit, all of the fat in solution, may be removed from the flask without permitting any of the residue to be discharged.

It at once becomes manifest that the position of the line of demarcation or separation between the fat in solution and the residue within the limits of the contraction 12, is immaterial to the efficient operation of the present flask, and it also becomes manifest that none of the fat in solution remains within the flask or is retained by a discharge tube or a stop-cock coöperating therewith.

The angle which the contraction 12 occupies with respect to either the extraction chamber 10 or the settling chamber 11, or both, is not of necessity either of those illustrated in the drawings, but may vary as desired. It has been found however, that the arrangement shown in the drawings is best adapted for carrying out the process in view, though, of course, other arrangements may be adopted which will be equally efficient and at the same time not depart from the spirit and scope of the present invention.

What is claimed is:

1. An extraction tube or flask comprising a settling chamber and an extraction chamber arranged at an angle one to the other.

2. An extraction tube or flask comprising an extraction chamber and a settling chamber communicating through a contraction angularly arranged therebetween.

3. An extraction tube or flask comprising an extraction chamber and a settling chamber, and means of communication arranged angularly between said chambers.

4. An extraction flask or tube comprising a settling chamber, and an extraction chamber arranged at an angle of less than 180° one to the other, said extraction chamber being provided with a discharge opening.

5. An extraction tube or flask comprising an extraction chamber, and a settling chamber communicating through a contraction angularly arranged at less than 180° therebetween.

6. An extraction tube or flask comprising an extraction chamber and a settling chamber, and means of communication arranged angularly at less than 180° between said chambers.

7. An extraction flask or tube comprising a plurality of chambers arranged one to the other at an angle of less than 180°.

8. An extraction flask or tube comprising a plurality of chambers arranged at an angle one to the other, one of said chambers being provided with an outlet located to one side of its axis.

9. An extraction flask or tube comprising a plurality of chambers arranged at an angle one to the other, one of said chambers having an outlet projecting at an angle to one side of its axis.

10. An extraction flask or tube comprising a settling chamber and an extraction chamber arranged at an angle of less than 180° and of at least 90° one to the other.

11. An extraction flask or tube comprising an extraction chamber and a settling chamber communicating through a contraction angularly arranged at less than 180° and at least 90° therebetween.

12. An extraction flask or tube comprising an extraction chamber and a settling chamber, and means of communication arranged angularly at less than 180° and at least 90° between said chambers.

13. An extraction flask or tube comprising a plurality of chambers arranged one to the other at an angle of less than 180° and at least 90°.

14. An extraction flask or tube comprising a settling chamber and an extraction chamber so angularly arranged one to the other that the contents of the extraction chamber may be poured therefrom without discharging the contents of the settling chamber.

JULIUS JOHN MOJONNIER.